April 22, 1941.  W. F. GROENE ET AL  2,239,443
TRANSMISSION MECHANISM FOR LATHES
Filed Aug. 12, 1939  6 Sheets-Sheet 5
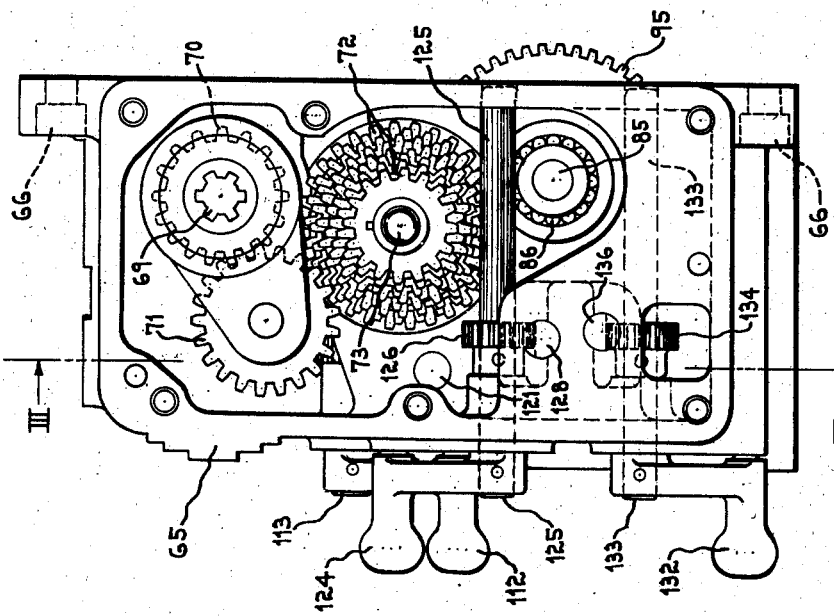
FIG. VI
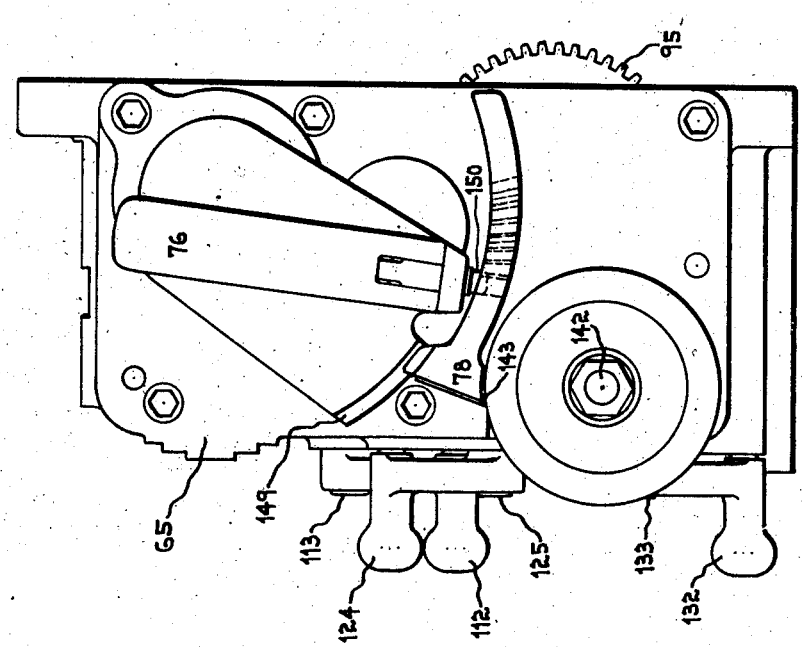
FIG. V
WITNESS.
Orlando S. Knof
INVENTORS.
WILLIAM F. GROENE
HARRY C. KEMPER
BY Willard G. Groue
ATTORNEY.

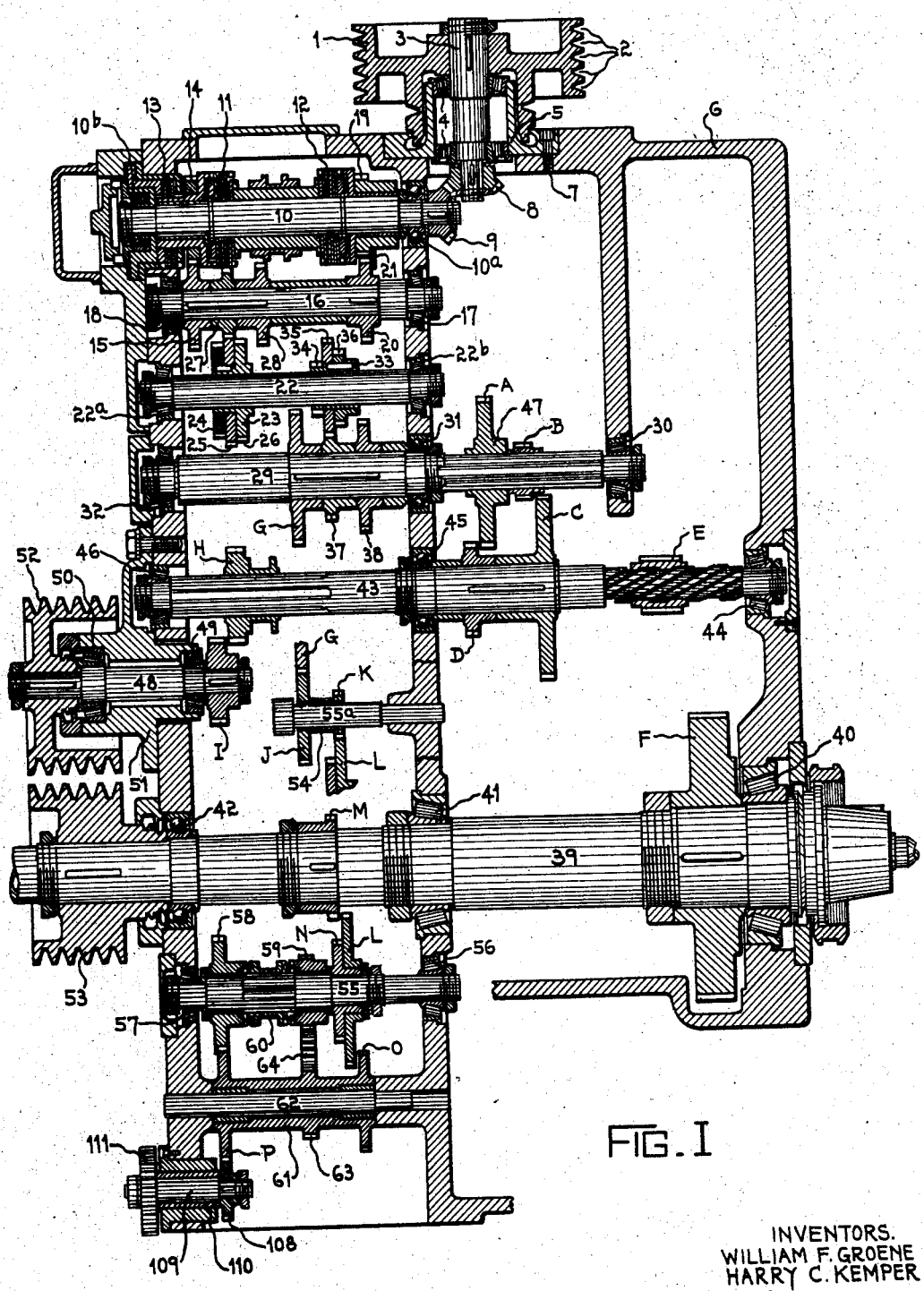
FIG. I

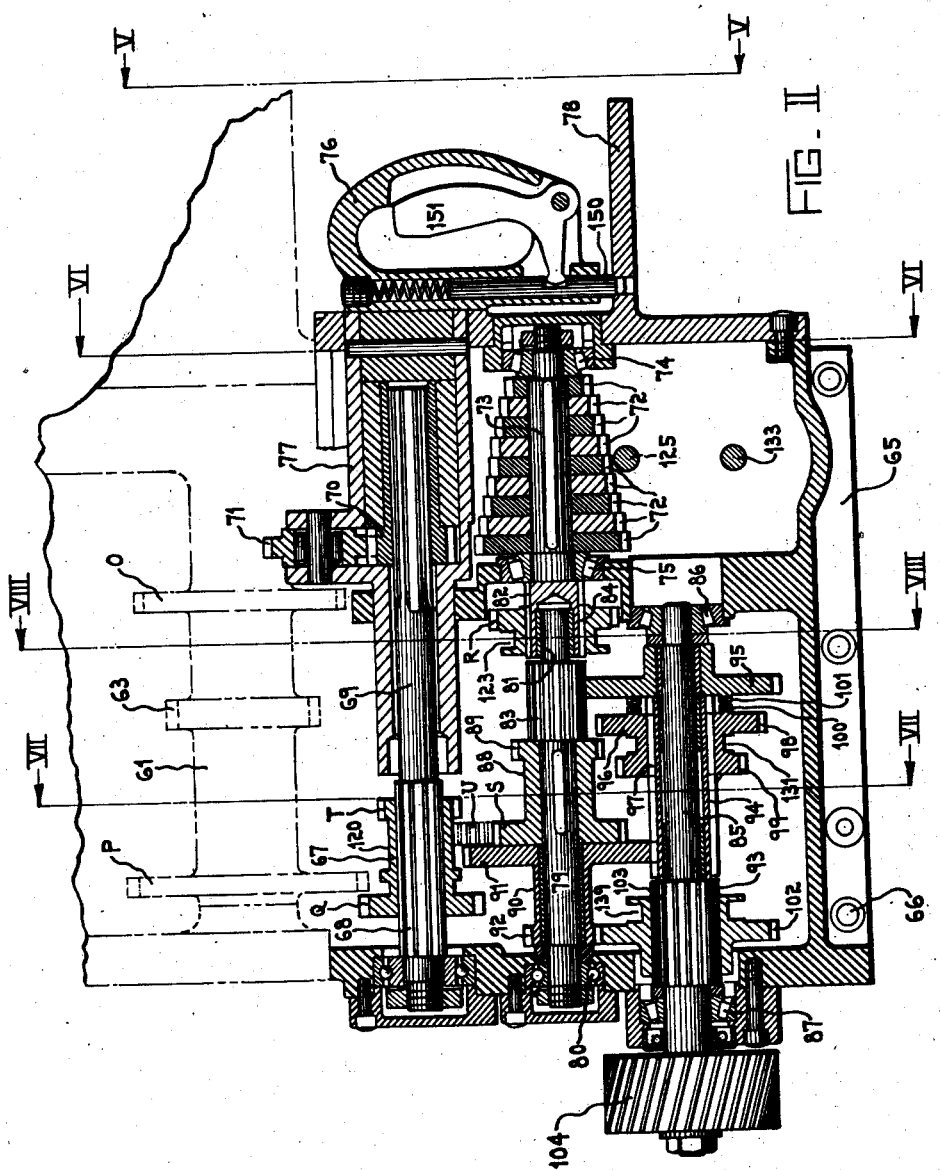

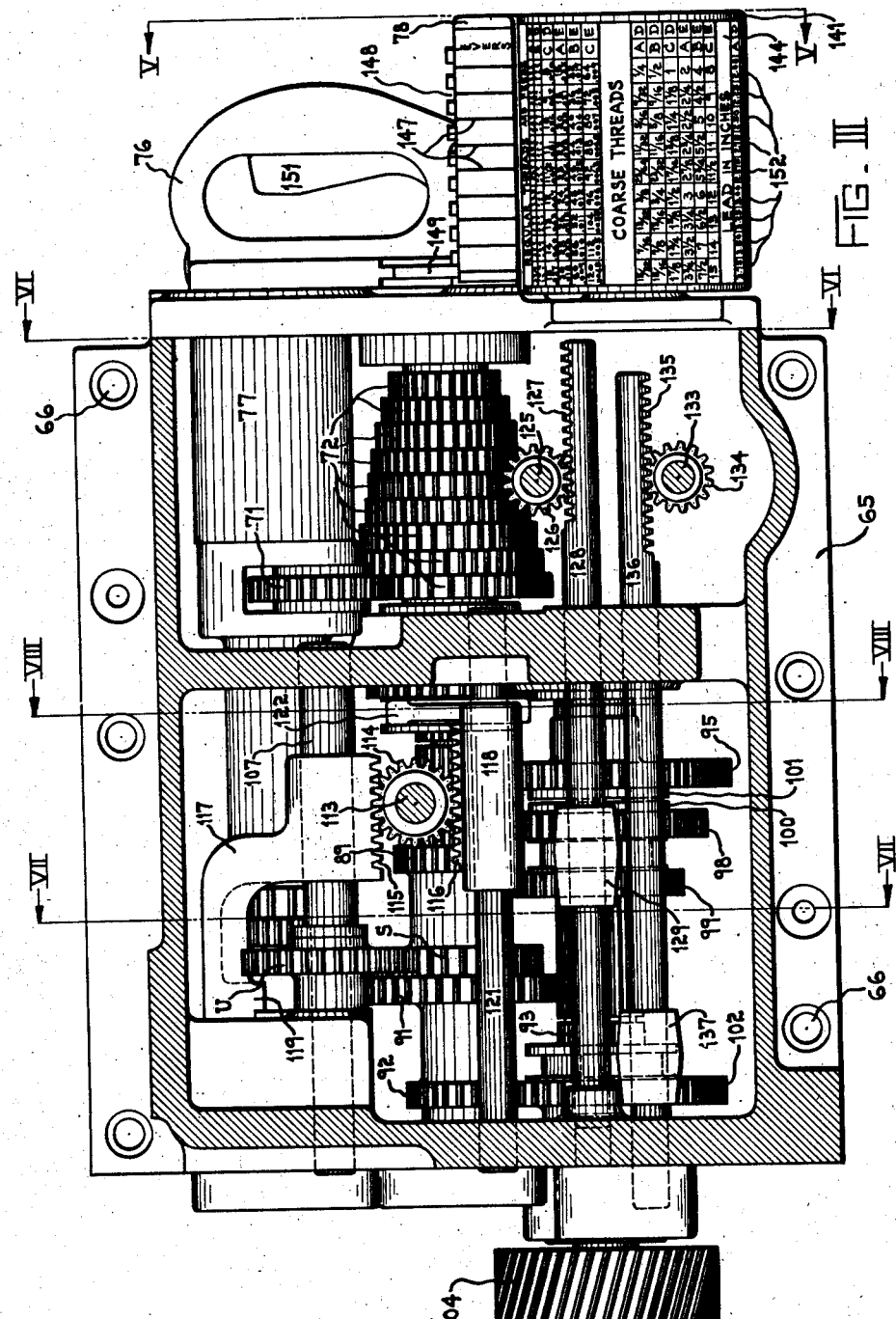

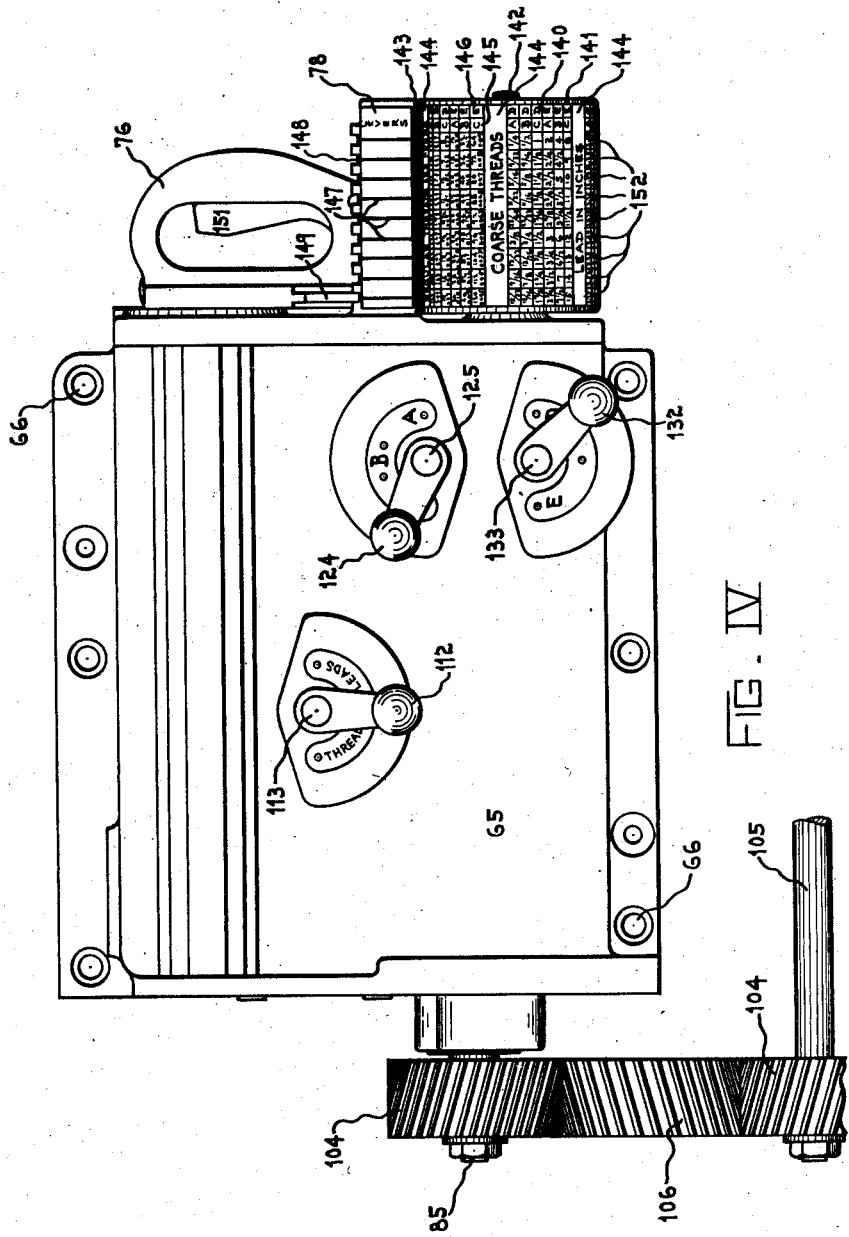

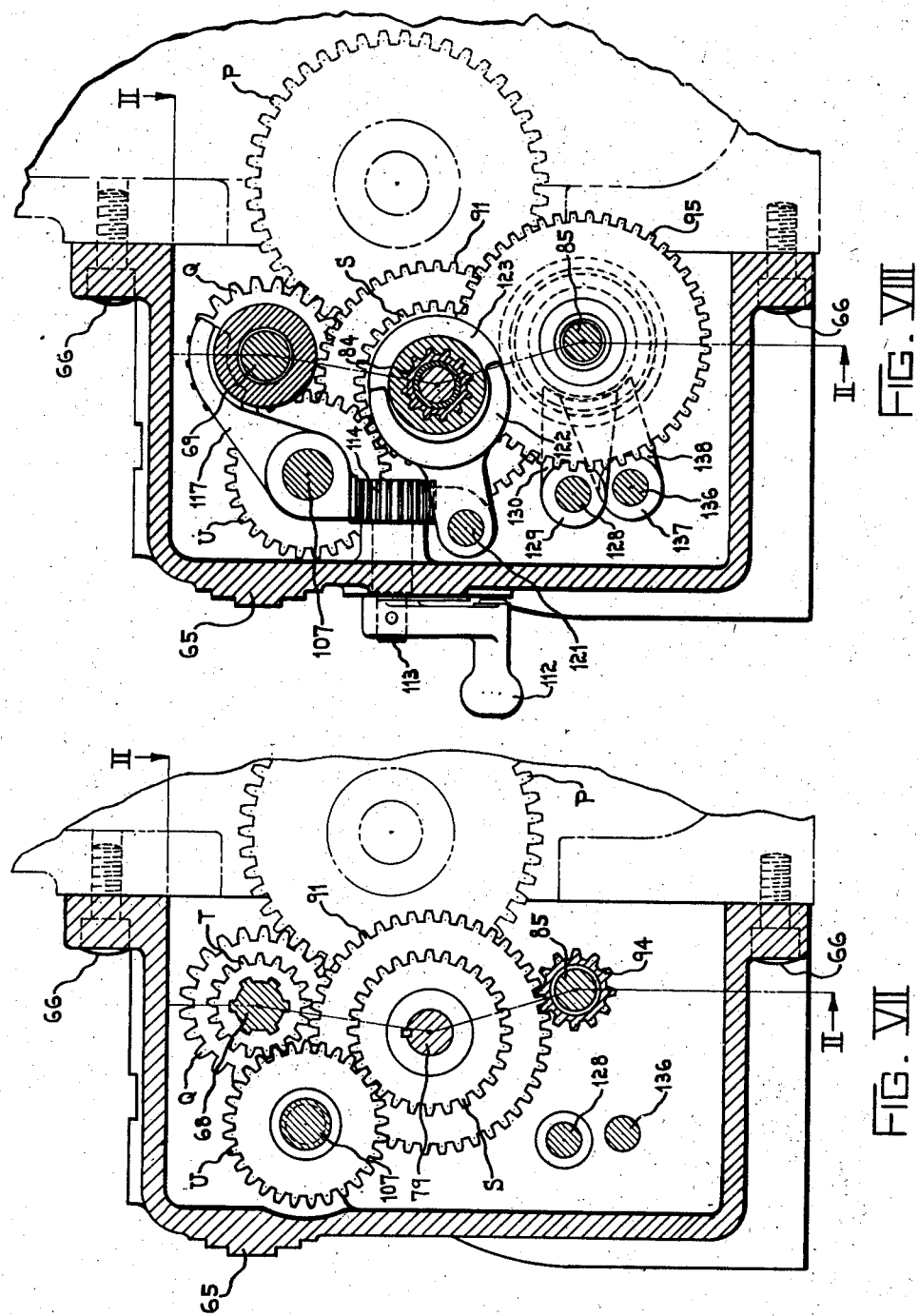

Patented Apr. 22, 1941

2,239,443

UNITED STATES PATENT OFFICE 2,239,443

TRANSMISSION MECHANISM FOR LATHES

William F. Groene and Harry C. Kemper, Cincinnati, Ohio, assignors to The R. K. Le Blond Machine Tool Company, Cincinnati, Ohio, a corporation of Delaware Application August 12, 1939, Serial No. 289,916

14 Claims. (Cl. 82—29)

This invention pertains to transmission mechanism for lathes and is particularly directed to spindle and feed drive transmissions for tool room lathes which are adapted to providing feeds, threads, and leads in both the English and metric systems of feeding and thread cutting.

The essential idea of this invention is to provide a simplified, compact, and highly efficient lathe transmission mechanism which is capable of being operated with a minimum of effort and thought on the part of the operator to produce regular threads and feeds, coarse threads, leads in inches, fine thread relieving, diametral pitch threads, leads and feeds in millimeters, and module pitch leads.

It is a further object to provide a lathe transmission capable of producing the above results in conjunction with certain definite speeds and modes of driving the work spindle of the lathe.

It is an object to provide means for driving the work spindle either by gearing or belts in conjunction with carrying out certain of the results above outlined in order to accomplish certain distinct beneficial results in the finished work by so interrelating these various things in a single transmission mechanism.

A further object is to provide means for operating certain portions of the transmission entirely independently of the spindle to relieve it completely from all strain while carrying on certain of the more difficult functions outlined above.

A further object is to provide a simplified lathe feed transmission including a cone of gears which may be changed from cutting threads to cutting leads by the mere flip of a single control lever.

It is also an object to provide, between such a transmission and a lead screw or feed rod of the lathe, change gear mechanism for cutting any special leads or threads or effecting any feeds in both the English or metric systems.

A still further feature is to provide in conjunction with this transmission mechanism an index plate which is simple to read and highly efficient in correlating the data for the positioning all of the control means for the transmission.

Further features and advantages of this invention will appear from the detailed description of the drawings in which:

Figure I is a diagrammatic section through a lathe headstock transmission incorporating features of this invention.

Figure II is a diagrammatic section on the line II—II of Figures VII and VIII of a feed box incorporating features of this invention and operating in conjunction with headstock transmission of Figure I.

Figure III is a vertical section through the feed box of Figure I substantially on the line III—III of Figure VI.

Figure IV is a front elevation of the feed box, particularly showing the arrangement of the control handle and dial indicating mechanism.

Figure V is a right hand end elevation of the feed box of Figure IV.

Figure VI is a vertical transverse section through the feed box on the line VI—VI of Figure II.

Figure VII is a vertical transverse section through the feed box on the line VII—VII of Figure II.

Figure VIII is a vertical transverse section through the feed box on the line VIII—VIII of Figure II.

Primary speed changes in headstock

This lathe transmission mechanism receives its driving power from the usual electric motor which is connected to the driving pulley 1 by suitable V-belts which operate in the grooves 2 in the pulley. The driving pulley 1 is fixed on the shaft 3 which is journaled on the bearings 4 in the bracket 5 fixed to the headstock housing 6 by the screws 7. On the inner end of the shaft 3 is fixed the bevel gear 8 which drives the bevel gear 9 fixed on the clutch shaft 10, journaled in bearings 10a and 10b in the housing 6, this carrying the forward clutch 11, the reverse clutch 12, and brake 13 for driving the transmission in either direction or to arrest its rotation. The forward clutch 11 has a gear 14 which drives the gear 15 fixed on the shaft 16 journaled in bearings 17 and 18 in the housing 6, the reverse clutch 12 having a gear 19 driving the gear 20 fixed on the shaft 16 through the idler gear 21. Three changes of speeds are effected in the splined shaft 22 journaled in bearings 22a and 22b in housing 6 by sliding the compound gear 23 composed of the individual gears 24, 25, and 26 which may thus be selectively engaged with the respective mating gears 15, 27, and 28 fixed on the shaft 16. Similarly three changes of speeds will be effected between shaft 22 and the shaft 29 journaled in bearings 30, 31, and 32 in the housing by sliding the compound gear 33 composed of the individual gears 34, 35, and 36 into engagement with the respective mating gears G, 37, and 38 fixed on the shaft 29. Thus nine primary speed changes in either direction are in effect in the shaft 29 of the headstock.

Gear and belt drive for spindle

This transmission mechanism is so arranged that the lathe spindle 39 may be gear driven at a plurality of different speeds or belt driven at a plurality of different speeds supplemented by the nine primary speed changes described above. When the spindle 39, which is journaled in bearings 40, 41, and 42 in the headstock 6, is to be gear driven the pinion E on the shaft 43 journaled in bearings 44, 45, and 46 is shifted into engagement with the face gear F fixed on the spindle 39.

The compound gear 47 on the shaft 29 comprising the gears A and B is shifted so its gear B drives the gear C fixed on the shaft 43 when low gear spindle speeds are desired, the compound gear 47 is shifted so its gear A drives the gear D fixed on the shaft 43 when high gear spindle speeds are desired.

When the spindle is to be belt driven the pinion E is disengaged from the face gear F and gear H on the shaft 43 is slid into engagement with the gear I on the driving pulley shaft 48 journaled in suitable bearings 49 and 50 in the bracket 51 fixed on the headstock 6. Appropriate belts connect the driving pulley 52 with the spindle pulley 53. Low and high belt driven speeds for the spindle 39 are obtained by respectively engaging gears B and C for low belt speed and A and D for high belt speed.

Regular threads and feeds

The unique coordinated arrangement of the feed and thread cutting drive mechanism and the headstock transmission mechanism to produce the various feeds, threads and leads for both the English and metric systems will now be described.

When the lathe is to be used for regular threads and feeds in the English system, the spindle may be rotated in low gear drive, high gear drive, or low belt drive speeds by appropriately shifting the gears 47, E, and H as discussed above. The drive to the lead screw or feed rod for actuating the lathe carriage is derived from the gear M fixed on the lathe spindle 39 which drives the gear J of the slidable compound gear 54 journaled on the shaft 55a fixed in the housing 6, which gear in turn drives the gear N fixed on the feed reverse shaft 55 journaled in bearings 56 and 57 in said housing. At this time the compound gear 54 is so shifted that its gear J is not in engagement with gear G on shaft 29 and its gear K is not in engagement with the gear L fixed on the feed reverse shaft 55.

On this feed reverse shaft is journaled the forward drive gear 58 and the reverse drive gear 59 which may be alternately connected in driving relation on the shaft 55 by appropriately sliding the usual single jaw clutch 60. The gear 58 directly drives the gear P of the cluster gear 61 journaled on the shaft 62 fixed in the housing 6 while the gear 59 drives the gear 63 of the cluster gear 61 through the idler gear 64 to effect the reversible driving of the compound gear 61.

Under these conditions the feed box 65 which is mounted on the headstock 6 by appropriate screws 66 is driven from the gear P (see Figure II) which is in mesh with the gear Q of the slidable compound gear 67 mounted on the splined portion 68 of the tumbler cylinder shaft 69, this shaft 69 having a pinion 70 driving the tumbler pinion 71 which may be selectively engaged with the various gears of the cone of gears 72 fixed on the cone gear shaft 73 journaled on bearings 74 and 75 in the feed box 65. A suitable manipulating handle 76 carried on the tumbler cylinder 77 serves to manipulate and position the tumbler gear 71 in desired positions as indicated by the index slot arm 78 of the feed box 65.

Journaled coaxial with the cone gear shaft 73 is the shaft 79 journaled in the bearing 80 in the feed box 65 in the pilot bearing 81 formed in the end of the shaft 73. This end of the shaft 73 is formed with a gear 82 which is identical with the integral gear 83 formed on the shaft 79. A gear R is arranged with an internal gear 84 in its base which is slidingly mounted on the portion 82 of shaft 73 and may be slid on the gear 83 of shaft 79 when it is desired to chuck these two shafts together in positive driving engagement, which is the position the gear R is shifted to under these conditions of regular threads and feeds.

Coarse thread and feed changes

In order to provide the necessary complete range of feeds, threads, and leads in both the English and metric systems a series of coarse speed changes is provided between the shaft 79 and the output shaft 85 journaled in the bearings 86 and 87 in the feed box 65. On the shaft 79 is formed the gear 83 as stated above, the compound gear 88 comprising the gears 89 and S fixed to the shaft, and the compound gear 90 comprising the gears 91 and 92 rotatably journaled on the shaft. On the output drive shaft 85 is formed the integral pinion 93 and also journaled on this shaft 85 is the pinion sleeve 94 and the clutch gear 95. The clutch gear is always in constant engagement with the pinion 83 in the shaft 79. Mounted for axial movement on the pinion sleeve 94 is a compound gear 96 adapted to drive the sleeve 94 through its internal gear bore 97 slidingly mounted on the pinion 94 of the sleeve. This compound gear 96 comprises a gear 98 and a gear 99 and has clutch teeth 100 on its face adapted to engage mating clutch teeth 101 on the gear 95. When the compound gear 96 is shifted axially to its extreme left position, Fig. II, the gears S and 96 will be engaged, when shifted to its intermediate position the gears 89 and 98 will be engaged, and when shifted to extreme right position it will be clutched in engagement with the gear 95.

The pinion 94 of the pinion sleeve is formed the same size and number of teeth as the pinion 93 formed on the shaft 85. The pinion 94 is in constant driving engagement with the gear 91 of the compound gear 90. On the pinion 93 is slidably mounted a gear 102 having an internal gear bore 103 snugly fitting about the teeth of the pinion 93 but permitting the gear to be shifted axially of the shaft 85 to engage over the pinion sleeve gear 94, when disengaged from the gear 92, so as to clutch this shaft 85 and sleeve 94 in positive driving engagement. When the gear 103 is shifted fully to the left, Fig. II, it will be supported only on the pinion 93 and will then be in driving engagement with the gear 92. When shifted fully to the right, the gear 102 will be disengaged from the gear 92, its internal gear bore 103 engaging over the pinion 94 to clutch the sleeve 94 and shaft 85 together.

In order to complete the drive from the output shaft 85 to the lathe carriage one-to-one ratio change gears 104 on this shaft 85 and on the lead screw or feed rod 105 (shown diagrammatically in Fig. IV) connected by suitable idler gear 106 is provided.

Coarse threads

When it is desired to chase coarse threads with this mechanism the gears B and C, and the gears E and F are engaged for rotating the spindle 39 in low gear speeds. Compound gear 54 (Fig. I) is moved to the left so that its gear J is in mesh with gear G and its gear K is in mesh with the gear L. Under these conditions the shaft 55 will be rotated at a more rapid rate than the work spindle 39 to effect relatively rapid movement to the lathe tool carriage relative to spindle rotation for chasing coarse threads. Aside from the use of the low gear spindle speed and the shifting of the gear 54 to the left (Fig. I) the remainder of the transmission is arranged as described when used for regular threads and feeds. A unique feature of this arrangement is that the feed drive, when cutting coarse threads, is not taken off of the work spindle 39 but from the shaft 29 so that the excessive strains involved in actuating the feeding mechanism in coarse threading is completely removed from the spindle thus affording greater accuracy and finish when doing this class of work. Furthermore the "hard" or speed up drive between work spindle and feed transmission is hereby eliminated as in this arrangement the high rate of feed relative to work spindle rotation is accomplished by decreasing the rate of spindle rotating relative to the feed transmission rather than increasing feed transmission speeds relative to spindle rotation. Thus a highly efficient transmission of power without strain on the work spindle is in effect for coarse threading.

Leads in inches

In cutting leads in inches the spindle is driven in low gear speeds by engaging the gears B and C, and E and F as described above. The cluster gear 61 is driven from the shaft 29, as in coarse threading, through the gears G—J, K—L, and 58—P or 59—64—63. However, the feed box operates differently than it does when coarse threading in that the gear R (Fig. II) is moved to the right disengaging the cone gear shaft 73 from the shaft 79 and meshing this gear R with the gear O of the cluster gear 61. At this time the cluster gear 67 is moved to the left disengaging its gear Q from the gear P and connect its gear T, through the idler gear U journaled on the shaft 107 fixed in the feed box 65, with the gear S on the shaft 79. When cutting leads in inches the lead screw drive is thus through the gears G—J, K—L, 58—P or 59—64—63, O—R, the cone gears 72—71—70, and T—U—S, through the coarse feed changes between shafts 79 and 85 and the one-to-one change gears 104.

Relieving attachment drive

A unique feature of this invention is to provide a drive for the relieving attachment which is unaffected by any selected arrangements of English or metric systems of feed or thread cutting set up in the feed box transmission and associated change gearing converting it to the lead screw or feed rod of the lathe. This drive for the relieving attachment (Fig. I) is taken from the gear P which drives a gear 108 fixed on the relieving attachment drive shaft 109 journaled in a suitable bearing 110 carried in the headstock housing 6. Suitable change gearing 3 associated with this shaft 109 and the relieving attachment is provided in the usual manner. It can thus be noted that shifting of any of the gearing in the feed box 65 can have no effect on the driving relationship between the headstock transmission and the relieving attachment drive. Thus relieving operations may be undertaken in connection with any of the threading or lead cutting functions to be performed by the lathe.

Fine thread relieving

When it is desired to do fine thread relieving the spindle is operated in low gear speed by engaging gears B—C and E—F as described. The feed gearing is arranged the same as when cutting coarse threads as described above with gears G—J, K—L, and P—Q in mesh. To complete the drive, however, it is merely necessary to apply two-to-one ratio change gears on shaft 85 and the lead screw or feed rod 105, that is the gear on the lead screw 105 should be twice the size of the gear on the shaft 85. Thus fine thread relieving may be accomplished by merely changing one change gear from the standard combination used for regular threads and feeds.

Diametral pitch threads

In operating the transmission for diametral pitch threads low gear spindle speed is used, the gears B—C and E—F being thus positioned in engagement. The feed drive transmission is arranged so that gears G—J, K—L, and P—Q are engaged. Between the shafts 85 and 105 change gears are provided which convert the regular coarse threads into diametral pitch threads within the proper ranges desired.

Leads and feeds in millimeters

This transmission mechanism is well adapted to provide metric leads and feeds by simply applying the usual metric translating gears, for English to metric, between the shaft 85 and the lead screw or feed rod 105. Under these conditions, the standard range of metric leads and feeds are obtained when the spindle is driven at low gear speed with gears B—C and E—F in mesh, the feed drive at this time being through gears G—J, K—L, O—R, and T—U—S. The lathe may also be operated in low gear, high gear, and low belt speeds with the feed drive through gears M—J—N, O—R, and T—U—S to get finer ranges of metric leads and feeds with a greater and high range of spindle speeds.

Module pitch leads

Metric or module pitch leads may also be obtained with this transmission by placing combined metric translating and diametral pitch conversion change gears between the shaft 85 and the lead screw or feed rod 105. Under these conditions the spindle is driven at low gear speeds through gears B—C and E—F, the feed drive being effected through the gears G—J, K—L, O—R, and T—U—S.

Control mechanism

The shifting of the cluster gears 23 and 33 of the headstock transmission to effect the primary speed changes is accomplished by the usual gear shifting lever for headstocks, for example of a character shown in copending application Serial Number 174,216 filed November 12, 1937. A similar lever is also arranged to effect shifting of the compound gears 47 and 54, and the gears E and H in the various sequences discussed above.

Noting particularly Figs. III, IV, and VIII, the compound gear 67 and the clutch gear R are shifted in the described sequence by the control lever 112 located on the front of the feed box 65 on the rock shaft 113 which is journaled in the box and has fixed on it a pinion 114 which engages the racks 115 and 116 on the respective shifter yokes 117 and 118. The yoke 117 is slidably mounted on the shaft 107 and has a forked end 119 engaging about the annular groove 120 in the gear 67. The yoke 118 is slidably mounted on the rod 121 fixed in the feed box and has a forked end 122 engaging in the annular slot 123 in the clutch gear R.

The compound gear 96 is manipulated to shifted positions by the control lever 124 on the front of the box 65 mounted on the rock shaft 125 journaled in the box and having a pinion 126 engaging a rack 127 on the shifter rod 128 slidably mounted in the box. A shifter yoke 129 fixed on this rod 128 has a gear engaging portion 130 operating in the annular slot 131 in the gear 96.

The gear 102 is manipulated to shifted positions by the control lever 132 on the front of the box 65 mounted on the rock shaft 133 journaled in the box and having a pinion 134 engaging a rack 135 on the shifter rod 136 slidably mounted in the box. A shifter yoke 137 fixed on this rod 136 has a gear engaging portion 138 operating in the annular slot 139 in the gear 102.

*Dial indicating mechanism*

In conjunction with the above mentioned control levers and associated with spade handle control 76 for the tumbler cylinder 77 and its tumbler gear 71 a unique dial indicating mechanism is provided which is especially adapted to the problems involved in indicating the proper positions of the various control handles and levers utilized in conjunction with this transmission mechanism. In a mechanism of this type wherein a large number of different ranges and classes of feed, threads and leads, in both the English and metric systems, are obtained considerable difficulty has arisen in providing a simple and easily read index plate or indicating dial which correlated all of the positions of all of the control levers for all ranges and classes of feeds, threads, and leads to be obtained. Because of the necessarily large amount of data which must be presented on such a plate, it has been difficult to make it easy to find the proper data thereon and to set the levers according to it.

In order to obviate these difficulties the index plate 140 has been wrapped around a cylinder 141 journaled on a suitable stud 142 fixed in the box 65. This cylinder 141 and plate 140 are mounted directly under the index slot arm 78 so the periphery of the cylinder 141 carrying the plate 141 may be rotated thereunder. The arm 78 has a knife edge 143 extending across the cylinder and plate to facilitate rapid and accurate reading of the data on the plate.

On the plate 140 are carried the main class headings 144 as set forth above, such as regular threads and feeds, coarse threads, leads in inches, fine thread relieving, diametral pitch threads, leads and feeds in millimeters, and module pitch leads which indicates the setting of the headstock lever for the gears 47, 54, E and H and also the setting of the lever 112 on the feed box. Also on the plate 140 are the columns of letters 145 and 146, column 145 indicating the positions of lever 124 on column 146 indicating the position of lever 132.

On the arm 78 are lines 147 which aid the eye in associating the data on the plate with the positioning slots 148 in arm 78 so that the positioning finger 149 on the handle 78 may be readily entered into the appropriate slot 148 in accordance with the position selected on the plate. The usual locking plunger 150 operated by the trigger 151 in the handle 78 serves to hold the tumbler cylinder in its selected positions.

Obviously the operation of this mechanism is rendered extremely simple by the unique arrangements here described. The operator merely rotates the cylinder 141 until the data he desires appears along the knife edge 143. He then moves the handle 76 as indicated by the lines 147 showing the specific feed or thread desired as shown in the nine brackets 152 of the plate. The levers 124 and 132 are quickly set by noting the letters appearing adjacent the knife edge 143 in columns 145 and 146. The headstock levers and the lever 112 in the box are set according to the main headings 144 of the plate. Thus the operator does not have to hunt around on a big index plate with this large amount of data nor does he have to be careful not to lose his place selected on the plate since the knife edge and the lines 147 keep his eye properly guided to the desired settings indicated on the plate 140.

Having fully set forth and described our invention what we claim and desire to secure by United States Letters Patent is:

1. In a lathe transmission mechanism, a shaft, means for rotating said shaft at a plurality of different speeds, a compound gear shiftably mounted on said shaft, a second shaft, a pair of gears fixed on said shaft adapted to be alternately engaged by said compound gear to effect two different speed changes in said second shaft, a gear shiftably mounted on said second shaft adapted to engage the face gear on the work spindle of said lathe, a gear shiftably mounted on said shaft adapted to engage a gear on a pulley shaft, a driving pulley on said pulley shaft, a driven pulley on said spindle, belted means interconnecting said pulleys, means for alternately engaging one or the other of said shiftable gears on said second shaft to effect gear driving or belt driving of said spindle, a feed transmission mechanism, a third shaft, a compound gear shiftably mounted on said third shaft, means for shifting said compound gear to at one time connect one of its gears to a gear on said second shaft and its other gear to the feed transmission and at another time to interconnect one of its gears with a gear on said spindle and said feed transmission.

2. In a lathe transmission mechanism, a shaft, means for rotating said shaft at a plurality of different speeds, a compound gear shiftably mounted on said shaft, a second shaft, a pair of gears fixed on said shaft adapted to be alternately engaged by said compound gear to effect two different speed changes in said second shaft, a gear shiftably mounted on said second shaft adapted to engage the face gear on the work spindle of said lathe, a gear shiftably mounted on said shaft adapted to engage a gear on a pulley shaft, a driving pulley on said pulley shaft, a driven pulley on said spindle, belted means interconnecting said pulleys, means for alternately engaging one or the other of said shiftable gears on said second shaft to effect gear driving or belt driving of said spindle, a feed reverse shaft, a pair of gears fixed on said shaft, a third shaft, a compound gear shiftably mounted on said third shaft, means for shifting said compound gear to at one time connect its larger gear to a gear on said second shaft and its smaller gear to one of the fixed gears on said feed reverse shaft and at another time to interconnect its large gear with a gear on said spindle and the other fixed gear on said feed reverse shaft, and transmission mechanism connecting said feed reverse shaft to the tool feed carriage of said lathe.

3. In a lathe transmission mechanism, a shaft, means for rotating said shaft at a plurality of different speeds, a compound gear shiftably mounted on said shaft, a second shaft, a pair of gears fixed on said shaft adapted to be alternately engaged by said compound gear to effect two different speed changes in said second shaft, a gear shiftably mounted on said second shaft adapted to engage the face gear on the work spindle of said lathe, a gear shiftably mounted on said shaft adapted to engage a gear on a pulley shaft, a driving pulley on said pulley shaft, a driven pulley on said spindle, belted means interconnecting said pulleys, means for alternately engaging one or the other of said shiftable gears on said second shaft to effect gear driving or belt driving of said spindle, a third shaft, a compound gear shiftably mounted on said third shaft, means for shifting said compound gear to at one time connect one of its gears to a gear on said second shaft and its other gear to a gear fixed on a feed reverse shaft and at another time to interconnect one of its gears with a gear on said spindle and said feed reverse shaft, and a feed transmission connectable to said feed reverse shaft.

4. In a lathe transmission mechanism, a shaft, means for rotating said shaft at a plurality of different speeds, a compound gear shiftably mounted on said shaft, a second shaft, a pair of gears fixed on said shaft adapted to be alternately engaged by said compound gear to effect two different speed changes in said second shaft, a gear shiftably mounted on said second shaft adapted to engage the face gear on the work spindle of said lathe, a gear shiftably mounted on said shaft adapted to engage a gear on a pulley shaft, a driving pulley on said pulley shaft, a driven pulley on said spindle, belted means interconnecting said pulleys, means for alternately engaging one or the other of said shiftable gears on said second shaft to effect gear driving or belt driving of said spindle, a third shaft, a compound gear shiftably mounted on said third shaft, means for shifting said compound gear to at one time connect one of its gears to a gear on said second shaft and its other gear to a gear fixed on a feed reverse shaft and at another time to interconnect one of its gears with a gear on said spindle and said feed reverse shaft, a cluster gear on a fourth shaft, means for driving said cluster gear from said feed reverse shaft, and a feed transmission connectable to said cluster gear.

5. In a lathe transmission mechanism, a shaft, means for rotating said shaft at a plurality of different speeds, a compound gear shiftably mounted on said shaft, a second shaft, a pair of gears fixed on said shaft adapted to be alternately engaged by said compound gear to effect two different speed changes in said second shaft, a gear shiftably mounted on said second shaft adapted to engage the face gear on the work spindle of said lathe, a gear shiftably mounted on said shaft adapted to engage a gear on a pulley shaft, a driving pulley on said pulley shaft, a driven pulley on said spindle, belted means interconnecting said pulleys, means for alternately engaging one or the other of said shiftable gears on said second shaft to effect gear driving or belt driving of said spindle, a third shaft, a compound gear shiftably mounted on said third shaft, means for shifting said compound gear to at one time connect one of its gears to a gear on said second shaft and its other gear to a gear fixed on a feed reverse shaft and at another time to interconnect one of its gears with a gear on said spindle and said feed reverse shaft, a cluster gear on a fourth shaft, means for driving said cluster gear from said feed reverse shaft, means for driving a relieving attachment from said cluster gear, and a feed transmission connectable to said cluster gear.

6. In a lathe transmission mechanism, a shaft, means for rotating said shaft at a plurality of different speeds, a compound gear shiftably mounted on said shaft, a second shaft, a pair of gears fixed on said shaft adapted to be alternately engaged by said compound gear to effect two different speed changes in said second shaft, a gear shiftably mounted on said second shaft adapted to engage the face gear on the work spindle of said lathe, a gear shiftably mounted on said shaft adapted to engage a gear on a pulley shaft, a driving pulley on said pulley shaft, a driven pulley on said spindle, belted means interconnecting said pulleys, means for alternately engaging one or the other of said shiftable gears on said second shaft to effect gear driving or belt driving of said spindle, a third shaft, a compound gear shiftably mounted on said third shaft, means for shifting said compound gear to at one time connect one of its gears to a gear on said second shaft and its other gear to a gear fixed on a feed reverse shaft and at another time to interconnect one of its gears with a gear on said spindle and said feed reverse shaft, a cluster gear having a pair of gears cooperating with the reversing gears of said feed reverse shaft and means for driving a feed transmission from one of said pair of gears and a third gear of said cluster gear.

7. In a lathe transmission mechanism, a shaft, means for rotating said shaft at a plurality of different speeds, a compound gear shiftably mounted on said shaft, a second shaft, a pair of gears fixed on said shaft adapted to be alternately engaged by said compound gear to effect two different speed changes in said second shaft, a gear shiftably mounted on said second shaft adapted to engage the face gear on the work spindle of said lathe, a gear shiftably mounted on said shaft adapted to engage a gear on a pulley shaft, a driving pulley on said pulley shaft, a driven pulley on said spindle, belted means interconnecting said pulleys, means for alternately engaging one or the other of said shiftable gears on said second shaft to effect gear driving or belt driving of said spindle, a third shaft, a compound gear shiftably mounted on said third shaft, means for shifting said compound gear to at one time connect one of its gears to a gear on said second shaft and its other gear to a gear fixed on a feed reverse shaft and at another time to interconnect one of its gears with a gear on said spindle and said feed reverse shaft, a cluster gear having a pair of gears cooperating with the reversing gears of said feed reverse shaft, means for driving a relieving attachment from one gear of said pair of gears, and means for driving a feed transmission from one of said pair of gears and a third gear of said cluster gear.

8. In a lathe transmission mechanism, a shaft, means for rotating said shaft at a plurality of different speeds, a compound gear shiftably mounted on said shaft, a second shaft, a pair of gears fixed on said shaft adapted to be alternately engaged by said compound gear to effect two different speed changes in said second shaft, a gear shiftably mounted on said second shaft adapted to engage the face gear on the work spindle of said lathe, a gear shiftably mounted on said shaft adapted to engage a gear on a pulley shaft, a driving pulley on said pulley shaft, a driven pulley on said spindle, belted means interconnecting said pulleys, means for alternately engaging one or the other of said shiftable gears on said second shaft to effect gear driving or belt driving of said spindle, a third shaft, a compound gear shiftably mounted on said third shaft, means for shifting said compound gear to at one time connect one of its gears to a gear on said second shaft and its other gear to a gear fixed on a feed reverse shaft and at another time to interconnect one of its gears with a gear on said spindle and said feed reverse shaft, a cluster gear having a pair of gears cooperating with the reversing gears of said feed reverse shaft and a third gear, a feed box transmission having a tumbler cylinder shaft, a slidable compound gear on said shaft arranged so one of its gears may be engaged with one of said pair of gears of said cluster gear, a tumbler gear driven by said tumbler cylinder shaft and adapted to engage a cone of gears on a cone gear shaft, a shaft mounted coaxially with said cone gear shaft, means for connecting or disconnecting said cone gear shaft and said coaxially mounted shaft in driving relationship, means for driving said cone gear shaft from said third gear of said cluster gear, means for driving said coaxially mounted shaft from the compound gear on said tumbler cylinder shaft and means for connecting said coaxially mounted shaft to the tool feed carriage of said lathe.

9. In a lathe transmission mechanism, a shaft, means for rotating said shaft at a plurality of different speeds, a compound gear shiftably mounted on said shaft, a second shaft, a pair of gears fixed on said shaft adapted to be alternately engaged by said compound gear to effect two different speed changes in said second shaft, a gear shiftably mounted on said second shaft adapted to engage the face gear on the work spindle of said lathe, a gear shiftably mounted on said shaft adapted to engage a gear on a pulley shaft, a driving pulley on said pulley shaft, a driven pulley on said spindle, belted means interconnecting said pulleys, means for alternately engaging one or the other of said shiftable gears on said second shaft to effect gear driving or belt driving of said spindle, a third shaft, a compound gear shiftably mounted on said third shaft, means for shifting said compound gear to at one time connect one of its gears to a gear on said second shaft and its other gear to a gear fixed on a feed reverse shaft and at another time to interconnect one of its gears with a gear on said spindle and said feed reverse shaft, a cluster gear having a pair of gears cooperating with the reversing gears of said feed reverse shaft and a third gear, a feed box transmission having a tumbler cylinder shaft, a slidable compound gear on said shaft arranged so one of its gears may be engaged with one of said pair of gears of said cluster gear, a tumbler gear driven by said tumbler cylinder shaft and adapted to engage a cone of gears on a cone gear shaft, a shaft mounted coaxially with said cone gear shaft, means for connecting or disconnecting said cone gear shaft and said coaxially mounted shaft in driving relationship, means for driving said cone gear shaft from said third gear of said cluster gear, means for driving said coaxially mounted shaft from the compound gear on said tumbler cylinder shaft, a single control lever for simultaneously engaging a gear of said compound gear on said tumbler pinion shaft with a gear of said pair of gears of the cluster gear and to actuate said means to connect said cone gear shaft and said coaxially mounted shaft or to disconnect said gears and said shafts and connect said cone gear shaft to said third gear of said cluster gear and to connect the other gear of said compound gear in said tumbler cylinder shaft to said coaxially mounted shaft, and means for connecting said coaxially mounted shaft to the tool feed carriage of said lathe.

10. In a lathe transmission mechanism, a shaft, means for rotating said shaft at a plurality of different speeds, a compound gear shiftably mounted on said shaft, a second shaft, a pair of gears fixed on said shaft adapted to be alternately engaged by said compound gear to effect two different speed changes in said second shaft, a gear shiftably mounted on said second shaft adapted to engage the face gear on the work spindle of said lathe, a gear shiftably mounted on said shaft adapted to engage a gear on a pulley shaft, a driving pulley on said pulley shaft, a driven pulley on said spindle, belted means interconnecting said pulleys, means for alternately engaging one or the other of said shiftable gears on said second shaft to effect gear driving or belt driving of said spindle, a third shaft, a compound gear shiftably mounted on said third shaft, means for shifting said compound gear to at one time connect one of its gears to a gear on said second shaft and its other gear to a gear fixed on a feed reverse shaft and at another time to interconnect one of its gears with a gear on said spindle and said feed reverse shaft, a cluster gear having a pair of gears cooperating with the reversing gears of said feed reverse shaft and a third gear, a feed box transmission having a tumbler cylinder shaft, a slidable compound gear on said shaft arranged so one of its gears may be engaged with one of said pair of gears of said cluster gear, a tumbler gear driven by said tumbler cylinder shaft and adapted to engage a cone of gears on a cone gear shaft, a shaft mounted coaxially with said cone gear shaft, means for connecting or disconnecting said cone gear shaft and said coaxially mounted shaft in driving relationship, means for driving said cone gear shaft from said third gear of said cluster gear, means for driving said coaxially mounted shaft from the compound gear on said tumbler cylinder shaft, a single control lever for simultaneously engaging a gear of said compound gear on said tumbler pinion shaft with a gear of said pair of gears of the cluster gear and to actuate said means to connect said cone gear shaft and said coaxially mounted shaft or to disconnect said gears and said shafts and connect said cone gear shaft to said third gear of said cluster gear and to connect the other gear of said compound gear on said tumbler cylinder shaft to said coaxially mounted shaft, an output shaft, change speed gearing between said coaxially mounted shaft and said output shaft and means for connecting said output shaft to the tool feed carriage of said lathe.

11. In a lathe transmission mechanism, a shaft, means for rotating said shaft at a plurality of different speeds, a compound gear shiftably mounted on said shaft, a second shaft, a pair of gears fixed on said shaft adapted to be alternately engaged by said compound gear to effect two different speed changes in said second shaft, a gear shiftably mounted on said second shaft adapted to engage the face gear on the work spindle of said lathe, a gear shiftably mounted on said shaft adapted to engage a gear on a pulley shaft, a driving pulley on said pulley shaft, a driven pulley on said spindle, belted means interconnecting said pulleys, means for alternately engaging one or the other of said shiftable gears on said second shaft to effect gear driving or belt driving of said spindle, a third shaft, a compound gear shiftably mounted on said third shaft, means for shifting said compound gear to at one time connect one of its gears to a gear on said second shaft and its other gear to a gear fixed on a feed reverse shaft and at another time to interconnect one of its gears with a gear on said spindle and said feed reverse shaft, a cluster gear having a pair of gears cooperating with the reversing gears of said feed reverse shaft and a third gear, a feed box transmission having a tumbler cylinder shaft, a slidable compound gear on said shaft arranged so one of its gears may be engaged with one of said pair of gears of said cluster gear, a tumbler gear driven by said tumbler cylinder shaft and adapted to engage a cone of gears on a cone gear shaft, a shaft mounted coaxially with said cone gear shaft, means for connecting or disconnecting said cone gear shaft and said coaxially mounted shaft in driving relationship, means for driving said cone gear shaft from said third gear of said cluster gear, means for driving said coaxially mounted shaft from the compound gear on said tumbler cylinder shaft, a single control lever for simultaneously engaging a gear of said compound gear on said tumbler pinion shaft with a gear of said pair of gears of the cluster gear and to actuate said means to connect said cone gear shaft and said coaxially mounted shaft or to disconnect said gears and said shafts and connect said cone gear shaft to said third gear of said cluster gear and to connect the other gear of said compound gear on said tumbler cylinder shaft to said coaxially mounted shaft, an output shaft, change speed gearing between said coaxially mounted shaft and said output shaft, a tool feed carriage, and change gearing interconnecting said tool feed carriage and said output shaft.

12. In a lathe, a work spindle transmission, a feed reverse shaft driven from said transmission, a cluster gear having a pair of gears cooperating with the reversing gears of said feed reverse shaft and a third gear, a feed box transmission having a tumbler cylinder shaft, a slidable compound gear on said shaft, a tumbler gear driven by said tumbler cylinder and adapted to engage a cone of gears on a cone gear shaft, a shaft mounted coaxially with said cone gear shaft, a gear slidably mounted on said cone gear shaft for movement to engage said coaxially mounted shaft to lock said shafts in driving relationship, control means for simultaneously moving said compound gear on said tumbler cylinder shaft and said gear on said cone gear shaft so as to either engage one of the gears of said compound gear with one of the pair of gears of said cluster gear and move said gear on the cone gear shaft to lock or to engage the other gear of said compound gear with a gear fixed on said coaxially mounted shaft and to enage the gear on said cone shaft with said third gear of said cluster gear, and change speed gearing between said coaxially mounted shaft and a lead screw or feed rod of a tool feed carriage of said lathe.

13. In a lathe, a work spindle transmission, a feed reverse shaft driven from said transmission, a cluster gear having a pair of gears cooperating with the reversing gears of said feed reverse shaft and a third gear, a feed box transmission having a tumbler cylinder shaft, a slidable compound gear on said shaft, a tumbler gear driven by said tumbler cylinder and adapted to engage a cone of gears on a cone gear shaft, a shaft mounted coaxially with said cone gear shaft, a gear slidably mounted on said cone gear shaft for movement to engage said coaxially mounted shaft to lock said shafts in driving relationship, control means for simultaneously moving said compound gear on said tumbler cylinder shaft and said gear on said cone gear shaft so as to either engage one of the gears of said compound gear with one of the pair of gears of said cluster gear and move said gear on the cone gear shaft to lock or to engage the other gear of said compound gear through an idler gear with a gear fixed on said coaxially mounted shaft and to engage the gear on said cone shaft with said third gear of said cluster gear, and change speed gearing between said coaxially mounted shaft and a lead screw or feed rod of a tool feed carriage of said lathe.

14. In a lathe, a work spindle transmission, a feed reverse shaft driven from said transmission, a cluster gear having a pair of gears cooperating with the reversing gears of said feed reverse shaft and a third gear, a feed box transmission having a tumbler cylinder shaft, a slidable compound gear on said shaft, a tumbler gear driven by said tumbler cylinder and adapted to engage a cone of gears on a cone gear shaft, a shaft mounted coaxially with said cone gear shaft, a gear slidably mounted on said cone gear shaft for movement to engage said coaxially mounted shaft to lock said shafts in driving relationship, control means for simultaneously moving said compound gear on said tumbler cylinder shaft and said gear on said cone gear shaft so as to either engage one of the gears of said compound gear with one of the pair of gears of said cluster gear and move said gear on the cone gear shaft to lock or to engage the other gear of said compound gear with a gear fixed on said coaxially mounted shaft and to engage the gear on said cone shaft with said third gear of said cluster gear, an output shaft, change speed gearing between said output shaft and said coaxially mounted shatf comprising a pinion formed on said coaxially mounted shaft, a gear fixed on said coaxially mounted shaft and a gear fixed on said shaft which is engaged by a gear of the compound gear on the tumbler pinion shaft, a compound gear rotatably journaled on said coaxially mounted shaft, a gear rotatably journaled on said output shaft arranged to be in constant engagement with said pinion of the coaxially mounted shaft, a sleeve gear rotatably journaled on said output shaft and arranged in constant mesh with a gear of said compound gear journaled on said coaxially mounted shaft, a compound gear slidably mounted on said sleeve gear having its gears arranged to engage the fixed gear on said coaxially mounted shaft and having clutching means for engaging the gear rotatably mounted on said output shaft, and a gear slidably mounted in driving relationship on the output shaft arranged to alternately engage a gear of said compound gear journaled on said coaxially mounted shaft or to engage said sleeve gear to lock said sleeve gear in driving relation on said output shaft, and means interconnecting said output shaft with the feed rod or lead screw of a tool feed carriage of said lathe.

WILLIAM F. GROENE.
HARRY C. KEMPER.